United States Patent [19]

Makita

[11] Patent Number: 5,440,395
[45] Date of Patent: Aug. 8, 1995

[54] SHROUD CONTACT WEAR SENSOR IN A TURBO MACHINE

[75] Inventor: Haruomi Makita, Komaki, Japan

[73] Assignee: Mitsubishi Jukogyo Kabushiki Kaisha, Tokyo, Japan

[21] Appl. No.: 197,261

[22] Filed: Feb. 16, 1994

[30] Foreign Application Priority Data

Feb. 17, 1993 [JP] Japan .................. 5-028043

[51] Int. Cl.⁶ .......................................... G01B 11/08
[52] U.S. Cl. .................. 356/384; 250/559.42; 356/381
[58] Field of Search ............. 356/373, 375, 378, 384, 356/381; 250/560, 561

[56] References Cited

U.S. PATENT DOCUMENTS

| | | | |
|---|---|---|---|
| 3,806,252 | 4/1974 | Harris et al. | 356/378 |
| 3,996,668 | 12/1976 | Sharon | 33/701 |
| 4,687,328 | 8/1987 | Shiraishi et al. | 356/378 |
| 4,916,942 | 4/1990 | Davidson | 73/119 R |

Primary Examiner—F. L. Evans
Attorney, Agent, or Firm—Wenderoth, Lind & Ponack

[57] ABSTRACT

The present invention is for use in measuring the amount of wear of a shroud disposed on the inner surface of a casing in a turbo machine. A sensor body enclosing a half mirror and defining a purge air intake port is mounted to a shroud disposed on the inner surface of a casing as opposed to the tip of rotor blades. A small conical hole is formed in the shroud at the end of the sensor body. The sensor body is connected to an electronics section, including a light-emitting circuit and an image processing circuit, by a light-transmitting fiber optic cable and a light-receiving multi-core fiber optic cable respectively. The electronics section calculates the amount of wear of the shroud from the amount of light reflected from the surface defining the conical hole, an opening in the end of which varies in size as the shroud wears. Therefore, the amount of wear of the shroud surface is measured without being influenced by variations in temperature and the measurement is thus highly precise.

5 Claims, 3 Drawing Sheets

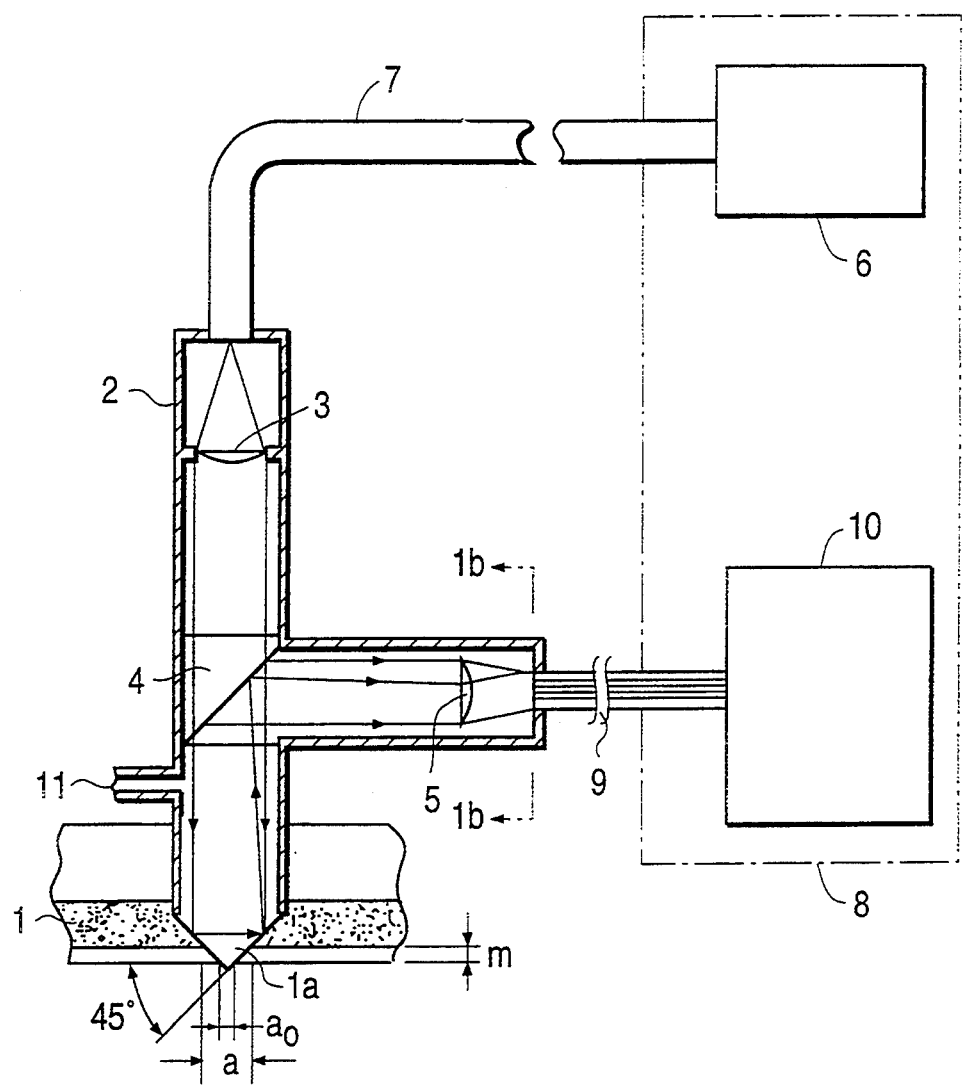
FIG. 1(a)
FIG. 2
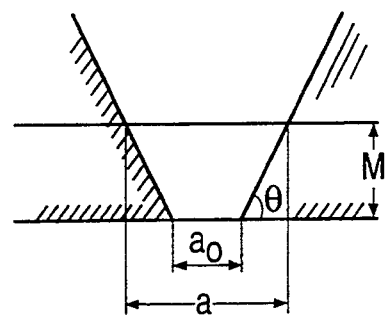
FIG. 1(b)
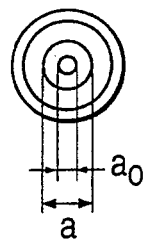

SHROUD CONTACT WEAR SENSOR IN A TURBO MACHINE

BACKGROUND OF THE INVENTION

1. Field of the Invention

The present invention relates to a shroud contact wear sensor in a turbo machine, such as the compressor or turbine of a jet engine, for use in measuring the amount of wear due to contact of a shroud between rotor blades and the shroud while the compressor or turbine is being operated.

2. Description of the Prior Art

A conventional device for measuring the clearance between the tip of rotor blades and a shroud in a turbo machine includes, as shown in FIG. 4, a clearance sensor 21 fixed to a shroud 22 which is disposed in a casing 23.

In a region where the shroud 22 is close to the rotor blades 25, a wearable portion 24 is provided because the shroud 22 may become worn by contact with the rotor blades 25 during operation. The clearance sensor 21 measures a clearance $C_1$ instead of the true clearance C, and the true clearance C is calculated by subtracting an initial thickness T of the wearable portion 24 from the clearance $C_1$, in accordance with the equation $C = C_1 - T$.

When the rotor blades contact the shroud during the operation of the turbo machine both the tip of the rotor blades and the wearable portion of the shroud are worn. It is possible, in the apparatus of the prior art, to measure an increase in clearance at the tip of the rotor blades caused by their wear, but it is impossible to measure an increase in the clearance caused by wearing of the shroud.

SUMMARY OF THE INVENTION

An object of the present invention is to solve the aforementioned problems in a turbo machine having a shroud disposed on the inner surface of a casing as opposed to the tips of rotor blades.

To achieve this object, the shroud contact wear sensor according to the present invention is used with a shroud having at its inner periphery a conical hole diverging toward its outer periphery, and comprises:
- a light-transmitting means for transmitting light from the outer periphery of the shroud into the conical hole;
- a light-receiving means for receiving the light from said light-transmitting means that has been reflected at the surface of the shroud defining the conical hole; and
- means for determining the diameter of any opening in the convergent end of the surface defining the conical hole on the basis of the quantity of light received by the light-receiving means and for determining the amount of wear of the inner peripheral surface of the shroud from the relation between the initial diameter of the opening in the convergent end of the surface and the current diameter of the opening.

In the shroud wear sensor described above, the light which has been transmitted from the light-transmitting means into the conical hole formed at the inner periphery of the shroud and diverging toward the outer periphery of the shroud is reflected at the conical surface defining the hole, but the light which has passed through the opening at the convergent end of the conical surface is not reflected. Accordingly, an image of the light entering the light-receiving means is annular, i.e. there is no light at the center of the image, and the amount of wear on the shroud side can be determined from the size of the center of the image.

As can be seen from FIG. 2, namely, when the convergent end of the conical surface having an angle of taper of $\theta$ is worn by contact with rotor blades so that the diameter of the opening at the end of the surface is increased from $a_0$ to $a$, the surface area will be correspondingly decreased, and the quantity of light reflected by the surface will also decrease in proportion thereto. After the diameter $a$ of the current opening is calculated from the quantity of light received by the light-receiving means, the wear in the thickness M direction of the shroud can be calculated in accordance with the following equation:

$$M = \frac{a - a_0}{2} \cdot \tan\theta$$

Thus, if the taper $\theta$ of the conical surface formed at the inner periphery of the shroud and diverging towards its outer periphery is known, the amount of wear can be obtained from the diameter of the opening as determined by the quantity of light reflected by the conical surface. Obviously, the relation between the amount of wear of the shroud and the change in the diameter of the diameter accompanied therewith can be stored in an electronics section so that this relation can be used to calculate the amount of wear.

It is thus possible to detect the wear of the shroud with accuracy.

The light-transmitting means can be made up of a light-emitting circuit, a single-core optical fiber cable connected with the light-emitting circuit and a lens for making parallel the light output from the cable. The light-receiving means can be made up of a multi-core optical fiber cable, and the processing means can determine the diameter of the opening from the relation between the number of fiber cores of said multi-core optical fiber cable which have received reflected light and the number of fiber cores thereof which have not received the same reflected light.

A focusing lens may be provided in front of the light-receiving end of the multi-core optical fiber cable, so that an image of the projected shape of the conical surface at the sensor end is focused at the inlet end of the multi-core optical fiber cable, whereby accurate information of the diameter of the opening at the convergent end of the conical surface is transmitted to the multi-core optical fiber cable.

Furthermore, the shroud contact wear sensor preferably has a sensor body forming an enclosure around an optical path leading from the light-transmitting portion of the light-transmitting means to the light-receiving portion of the light-receiving means, and a purge air intake port. Pressurized air is supplied through the purge air intake port into the sensor body, thereby preventing foreign matter from invading from the inside of a turbo machine into the sensor body and from being deposited thereon such that the precision in measuring the wear of the shroud is not lowered.

By virtue of the sensor according to the present invention, the wear of the shroud surface can be measured with a high degree of precision as the measurement is not influenced by variations in temperature due to the fact that the sensor is of an optical type. Accordingly, the clearance between the shroud surface and rotor blades can also be measured with high precision by using the present invention in combination with a conventional clearance sensor.

BRIEF DESCRIPTION OF THE DRAWINGS

In the accompanying drawings:

FIG. 1 illustrates one preferred embodiment of a shroud contact wear sensor according to the present invention, wherein FIG. 1(a) is a schematic diagram of the sensor and FIG. 1(b) is a sectional view taken along line 1b—1b of FIG. 1(a);

FIG. 2 illustrates the principle behind the operation of the contact wear sensor according to the present invention;

DETAILED DESCRIPTION OF THE PREFERRED EMBODIMENT

Figure 3:
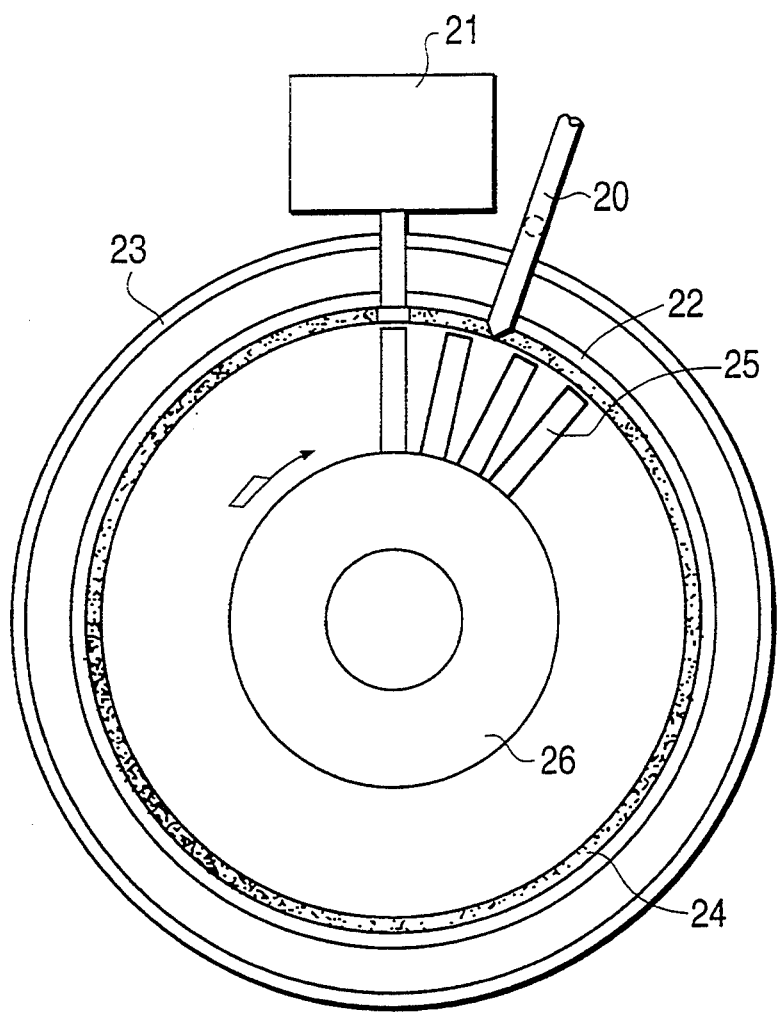
FIG. 3 is a schematic diagram of a cross section of an apparatus in which the preferred embodiment is used in combination with a clearance sensor.
Figure 4:
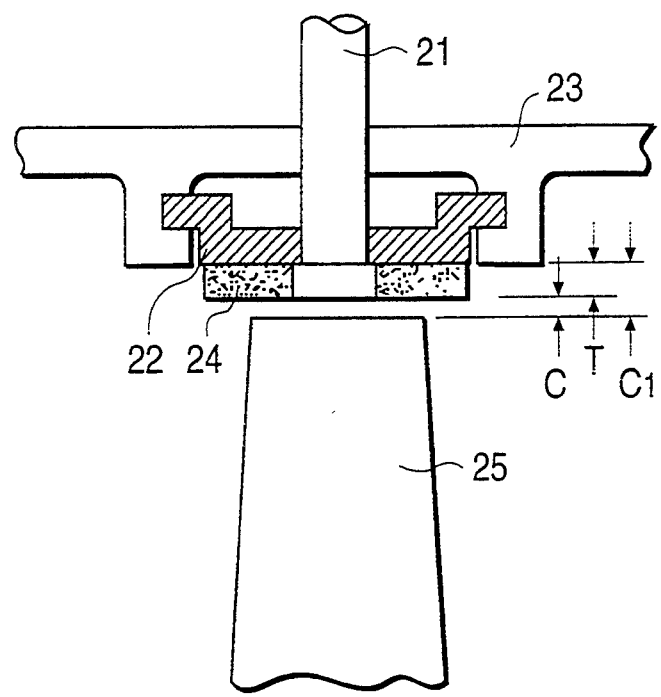
FIG. 4 is an illustrative view of the apparatus of the prior art.

The shroud contact wear sensor according to the present invention is shown in FIG. 1. In FIG. 1, reference numeral 2 designates a sensor body attached on a stationary shroud 1. Numeral 8 designates an electronics section which contains a light-emitting circuit 6 including a semiconductor laser and a light-receiving image processing circuit 10. The electronic components of the electronics section are located in an environment having a nearly normal temperature.

The sensor body 2 and electronics section 8 are connected to each other by a light-transmitting single-core optical fiber cable 7 and a light-receiving multi-core optical fiber cable 9. The sensor body 2 encloses a light-transmitting system comprising a lens 3 for converging laser light, propagating from the light-transmitting optical fiber cable 7, into a parallel beam and a half mirror 4 for separating the light to be transmitted and the light to be received, and a light-receiving system comprising the half mirror 4 which is also used to lead laser beam reflected from the conical surface (having a 45° taper) defining a small hole 1a in the shroud at the sensor end to the light-receiving optical fiber cable 9 and a focusing lens 5 for focusing the reflected light onto the end face of the light-receiving optical fiber cable 9. The casing of the sensor body 2 includes a purge air intake port 11 for allowing air into the casing.

Next, the operation of the shroud contact wear sensor will be described. The light-emitting circuit 6 of the electronics section 8 emits a laser beam which is transmitted through the optical fiber cable 7, and the laser beam exits from the end of the cable 7 connected with the sensor body 2. Since the diameter of the optical fiber cable 7 is rather small, the end thereof can be regarded as a point light source. The exiting light is made parallel by the lens 3, and after the parallel beam passes through the half mirror 4, it arrives at the end of the sensor body 2 where is impinges the conical surface defining the hole 1a in the shroud 1.

The beam is reflected at the conical surface defining small hole 1a across the conical surface where it is again reflected by the conical surface to the half mirror 4.

The reflected laser beam arrives at the half mirror 4 and is further reflected by 90° towards the focusing lens 5. The light focused by the lens 5 onto the inlet end of the light-receiving multi-core optical fiber cable 9 corresponds to the projected image of the conical hole at the sensor end as shown in FIG. 1(b).

The thus-focused image is sent through the light-receiving multi-core optical fiber cable 9 to the light-receiving image processing circuit 10, where the current diameter a of the opening at the sensor end is determined by image processing. It will be apparent that a value obtained by multiplying half of the difference between the diameter $a_0$ of an initial opening at the convergent end of the conical surface (in FIG. 1, this initial diameter shows no wear) and the current diameter a by tan $\theta$ obviously corresponds to the amount the shroud has worn.

The light-receiving image processing circuit 10 comprises means for determining the current diameter a at the end of the conical surface on the basis of the quantity of the light received by the light-receiving multi-core optical fiber cable 9 and means for determining the wear of the inner peripheral surface of said shroud from the relation between the initial diameter $a_0$ of the opening at the end of the conical surface and the current diameter a.

Although the conical surface at the sensor end is to reflect the laser beam, it is unnecessary to subject the same conical surface to a mirror finishing because even when the laser beam is diffused upon being reflected, the diffused light can be focused into a suitable image by virtue of the action of the focusing lens 5 as shown in FIG. 1. In addition, pressurized air taken in from the purge air intake port 11 is discharged through the small hole 1a to the main flow of a turbine, whereby foreign matter can be prevented from being deposited on the inside of the sensor.

One example of a procedure for determining the amount of wear according to this preferred embodiment will now be described. As the diameter of the opening at the end of the conical surface approaches a, less of the laser light will be reflected. Therefore, less laser light will enter into the light-receiving multi-core optical fiber cable 9. By counting the number of fiber cores of the light-receiving multi-core optical fiber cable 9 receiving light, the current diameter a can be easily calculated from the functional relation between the diameter bounding the area and the number of fiber cores receiving the light. After the current diameter a has been determined as mentioned above, a value is obtained by multiplying half of the difference between the current diameter a and the initial diameter $a_0$ by tan $\theta$ to yield the amount of wear of the shroud.

FIG. 3 shows the shroud contact wear sensor of this preferred embodiment in combination with a conventional rotor blade tip clearance sensor.

The wearable portion 24 of a shroud 22 is supported inside a casing 23 at a given clearance from rotor blades 25 attached to a rotating turbine shaft 26. A shroud contact wear sensor 20 is attached to the casing 23 close to a tip clearance sensor 21.

The tip clearance sensor 21 measures the distance between the tip of the rotor blades 25 and the shroud 22, and the contact wear sensor 20 measures at the same time the amount of wear of the wearable portion 24 of the shroud 22 itself. By measuring the difference between both the measurements at real times, a true rotor blade tip clearance in the vicinity of both of the sensors can be measured.

If a combination of the tip clearance sensor 21 and the shroud contact wear sensor 20 is installed at a plurality of locations on the periphery of the casing 23, it is possible to determine the circumferential distribution of the tip clearance of the rotor blades.

By adjusting the diameter of the shroud on the basis of the thus-obtained true tip clearance of the rotor blades, a proper clearance therebetween can be established, whereby the effectiveness of a turbo machine, such as a jet engine, can be enhanced.

By virtue of the shroud contact wear sensor in a turbo machine according to the present invention, as mentioned above, the amount of wear of a shroud can be measured with high precision because the measurement is not influenced by variations in temperature. By using the shroud wear sensor according to the present invention in combination with a conventional clearance sensor, it further becomes possible to measure the clearance between the shroud surface and rotor blades with high precision.

What is claimed is:

1. In a turbo machine having a shroud disposed on the inner surface of a casing as opposed to the tip of rotor blades, said shroud having a hole therein defined by a conical surface diverging from the inner towards the outer periphery of the shroud such that a hole is worn in a convergent end of the conical surface as an inner peripheral surface of the shroud wears, a shroud wear sensor comprising:

light-transmitting means for transmitting light from the outer periphery of said shroud toward said conical surface;

light-receiving means for receiving the light from said light-transmitting means, that has been reflected from said conical surface;

image processing means for determining the diameter of any opening in the convergent end of the conical surface on the basis of the quantity of the light received by said light-receiving means, and for determining the amount that the shroud has worn at the inner peripheral surface of said shroud from the relation between the diameter of any initial opening in the distal end of the conical surface and the current diameter of the opening in the convergent end of said conical surface.

2. A shroud wear sensor in a turbo machine according to claim 1, wherein said light-transmitting means comprises a light-emitting circuit, a single-core optical fiber cable connected with said light-emitting circuit and a lens for converting light emitted from said cable into parallel rays, said light-receiving means comprises a multi-core optical fiber cable, and said image processing means determines the diameter of said opening from the relation between the number of fiber cores of said multi-core optical fiber cable which have received light reflected from said conical surface and the number of fiber cores thereof which have not received the same reflected light.

3. A shroud wear sensor in a turbo machine according to claim 2, and further comprising a focusing lens disposed in an optical path between a light-receiving end of said multi-core optical fiber cable and said light-transmitting means.

4. A shroud wear sensor in a turbo machine, according to claim 2, and further comprising a sensor body forming an enclosure around an optical path leading from an upstream portion of said light-transmitting means to a downstream portion of said light-receiving means, and a purge air intake port extending through said enclosure.

5. A shroud wear sensor in a turbo machine, according to claim 3, and further comprising a sensor body forming an enclosure around an optical path leading from an upstream portion of said light-transmitting means to a downstream portion of said light-receiving means, and a purge air intake port extending through said enclosure.

* * * * *